Aug. 22, 1939.    N. W. LYON    2,170,760

BOTTLE HOODING MACHINE

Filed Feb. 7, 1936    11 Sheets-Sheet 2

INVENTOR
NORMAN W. LYON
BY
Chapin & Neal
ATTORNEYS

Aug. 22, 1939.　　　　N. W. LYON　　　　2,170,760
BOTTLE HOODING MACHINE
Filed Feb. 7, 1936　　　11 Sheets-Sheet 3
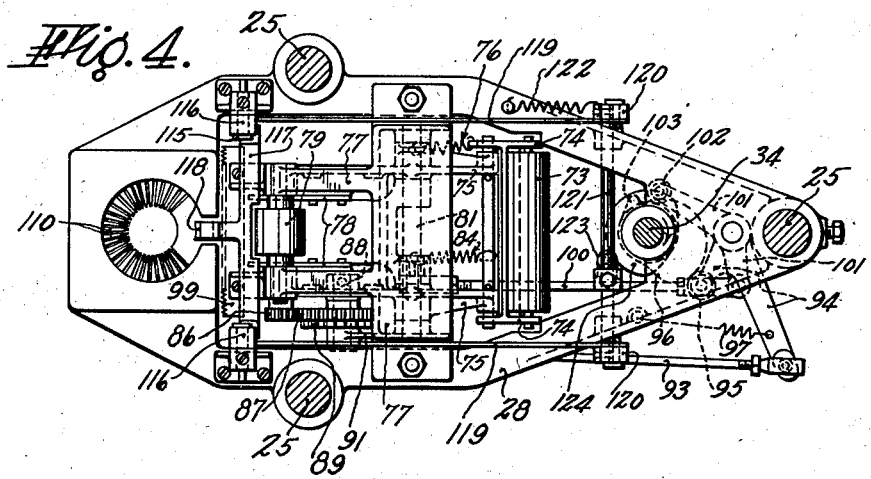
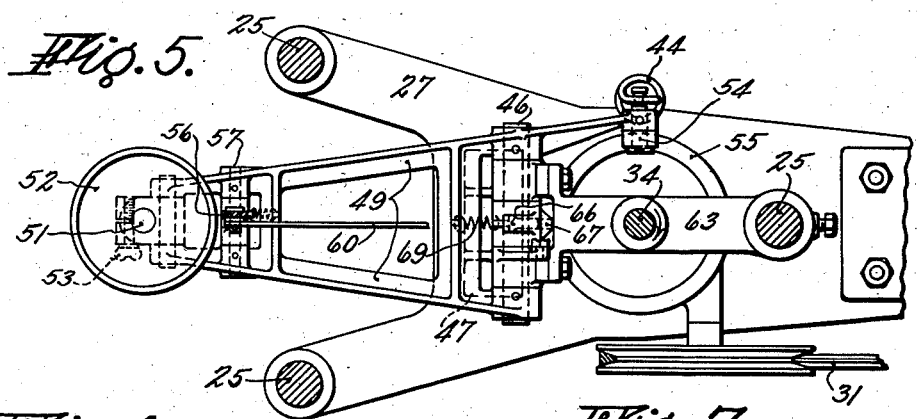
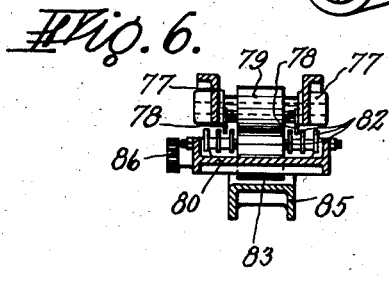
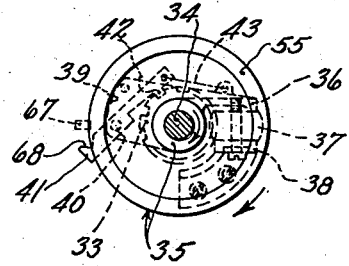
INVENTOR
NORMAN W. LYON
BY
Chapin + Neal
ATTORNEYS

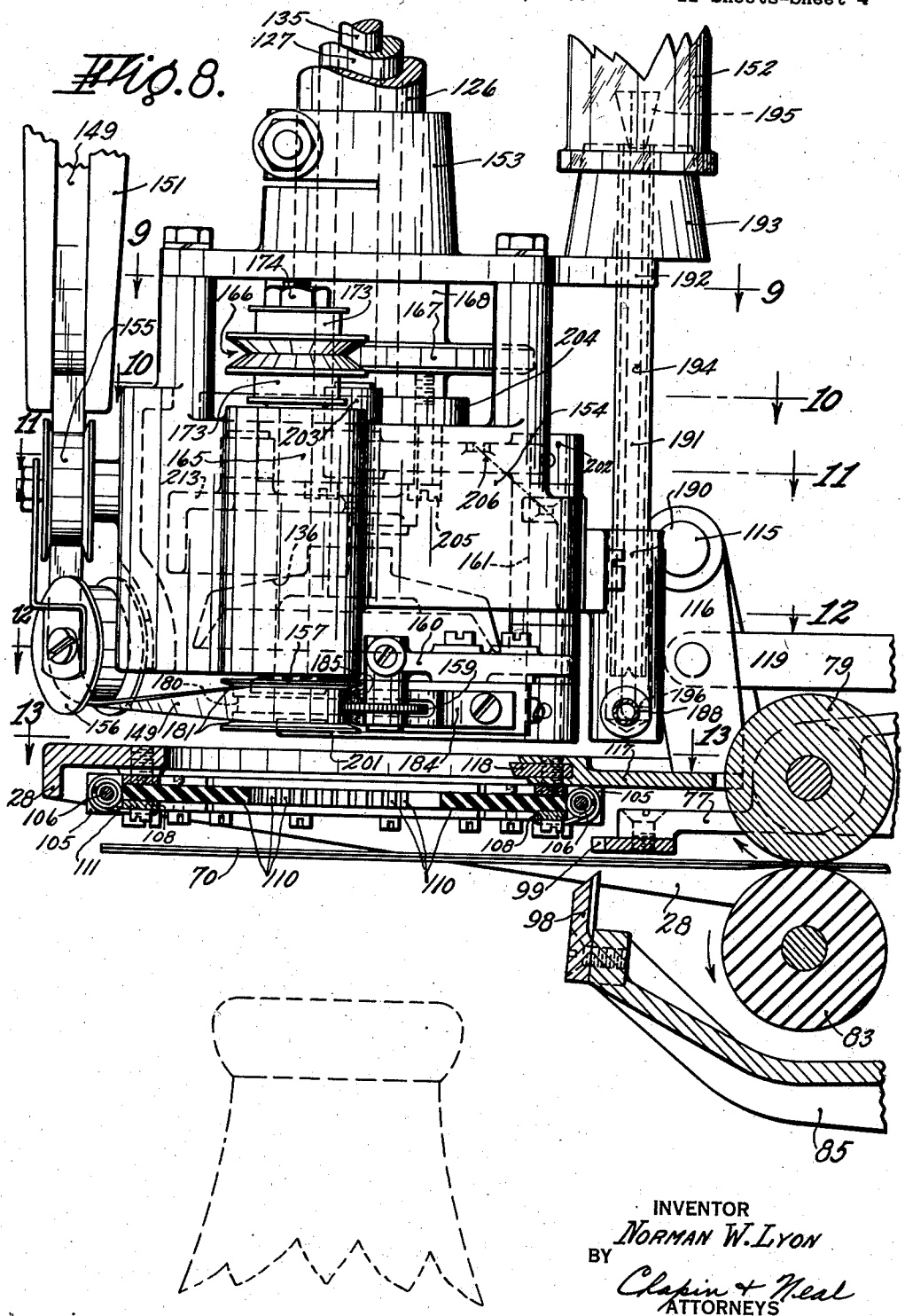

Aug. 22, 1939.   N. W. LYON   2,170,760
BOTTLE HOODING MACHINE
Filed Feb. 7, 1936    11 Sheets-Sheet 5

INVENTOR
Norman W. Lyon
BY
Chapin + Neal
ATTORNEYS

Aug. 22, 1939.   N. W. LYON   2,170,760
BOTTLE HOODING MACHINE
Filed Feb. 7, 1936   11 Sheets-Sheet 6
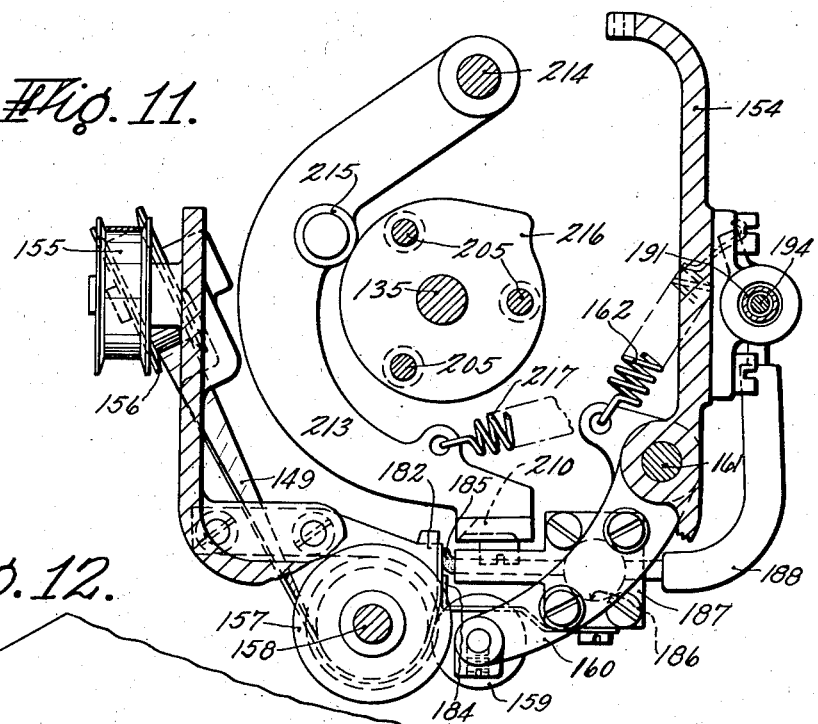
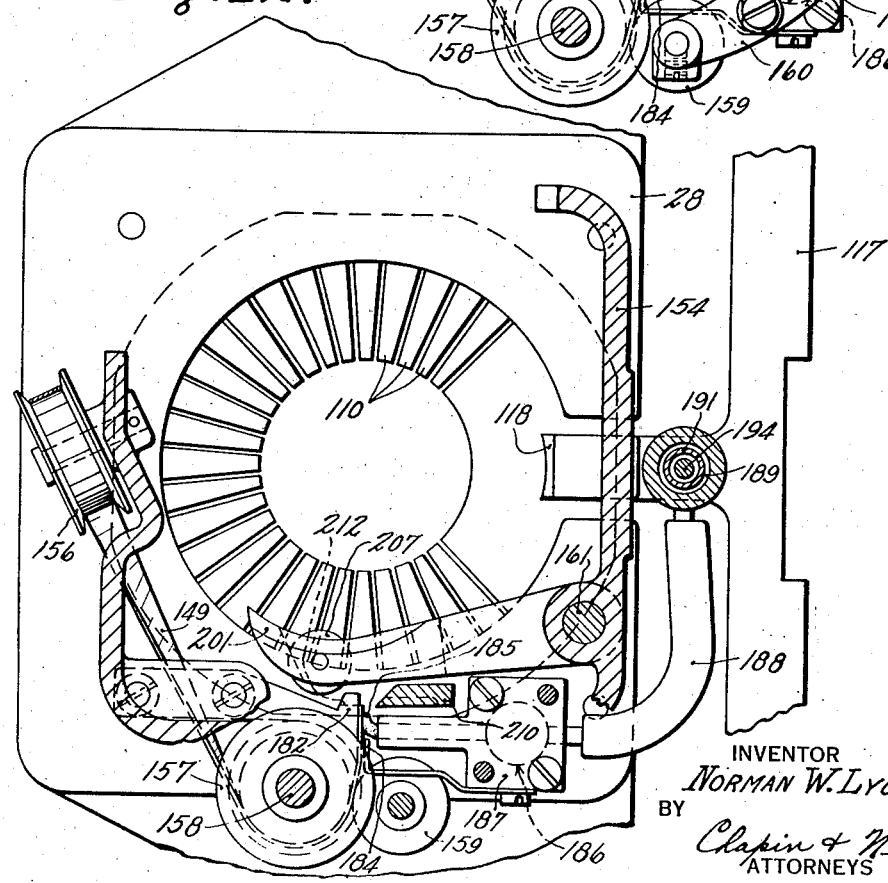
INVENTOR
NORMAN W. LYON
BY
Chapin & Neal
ATTORNEYS Aug. 22, 1939.   N. W. LYON   2,170,760
BOTTLE HOODING MACHINE
Filed Feb. 7, 1936    11 Sheets-Sheet 7

INVENTOR
NORMAN W. LYON
BY
Chapin + Neal
ATTORNEYS

Aug. 22, 1939.   N. W. LYON   2,170,760
BOTTLE HOODING MACHINE
Filed Feb. 7, 1936   11 Sheets-Sheet 8

INVENTOR
NORMAN W. LYON
BY
Chapin & Neal
ATTORNEYS

Aug. 22, 1939.　　　　　N. W. LYON　　　　　2,170,760
BOTTLE HOODING MACHINE
Filed Feb. 7, 1936　　　　11 Sheets-Sheet 9

INVENTOR
NORMAN W. LYON
BY
Chapin + Neal
ATTORNEYS

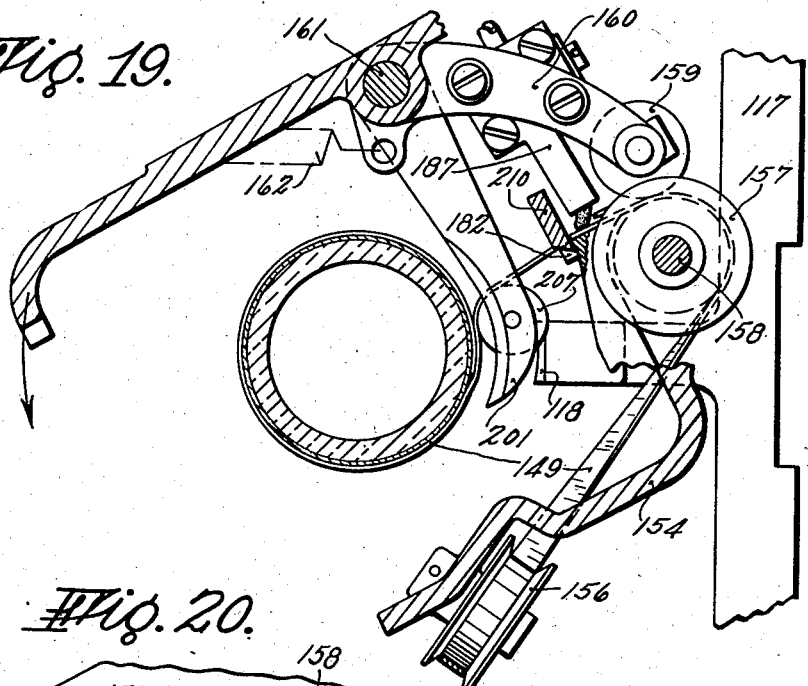
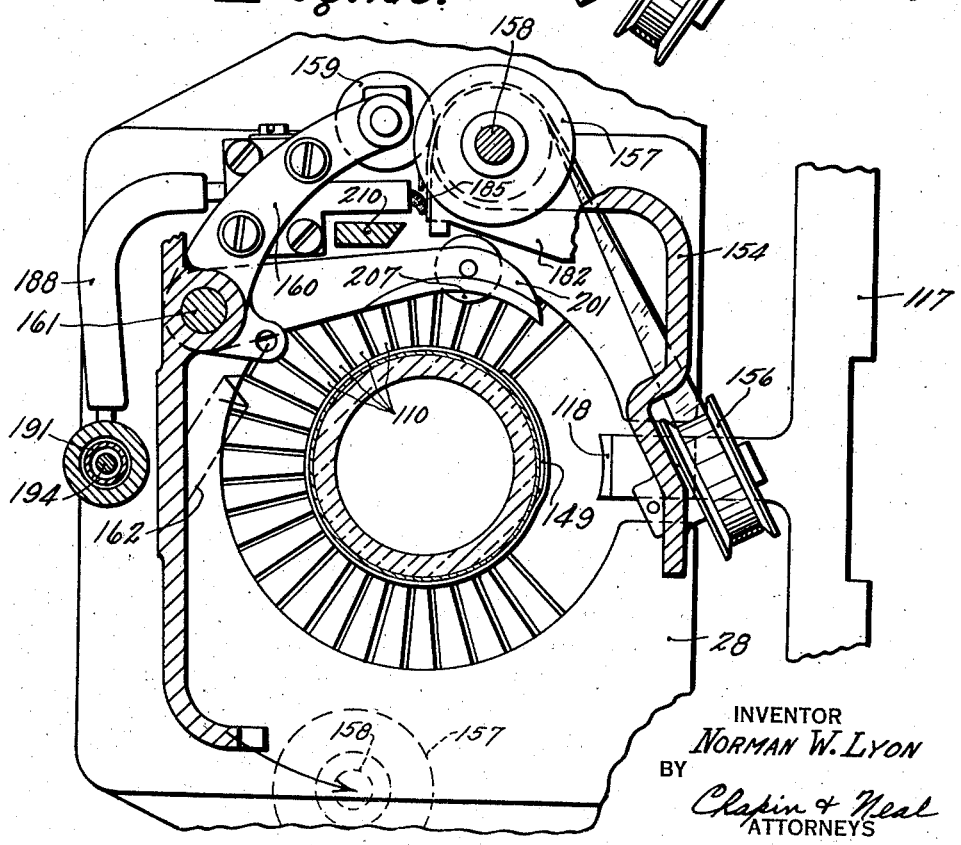

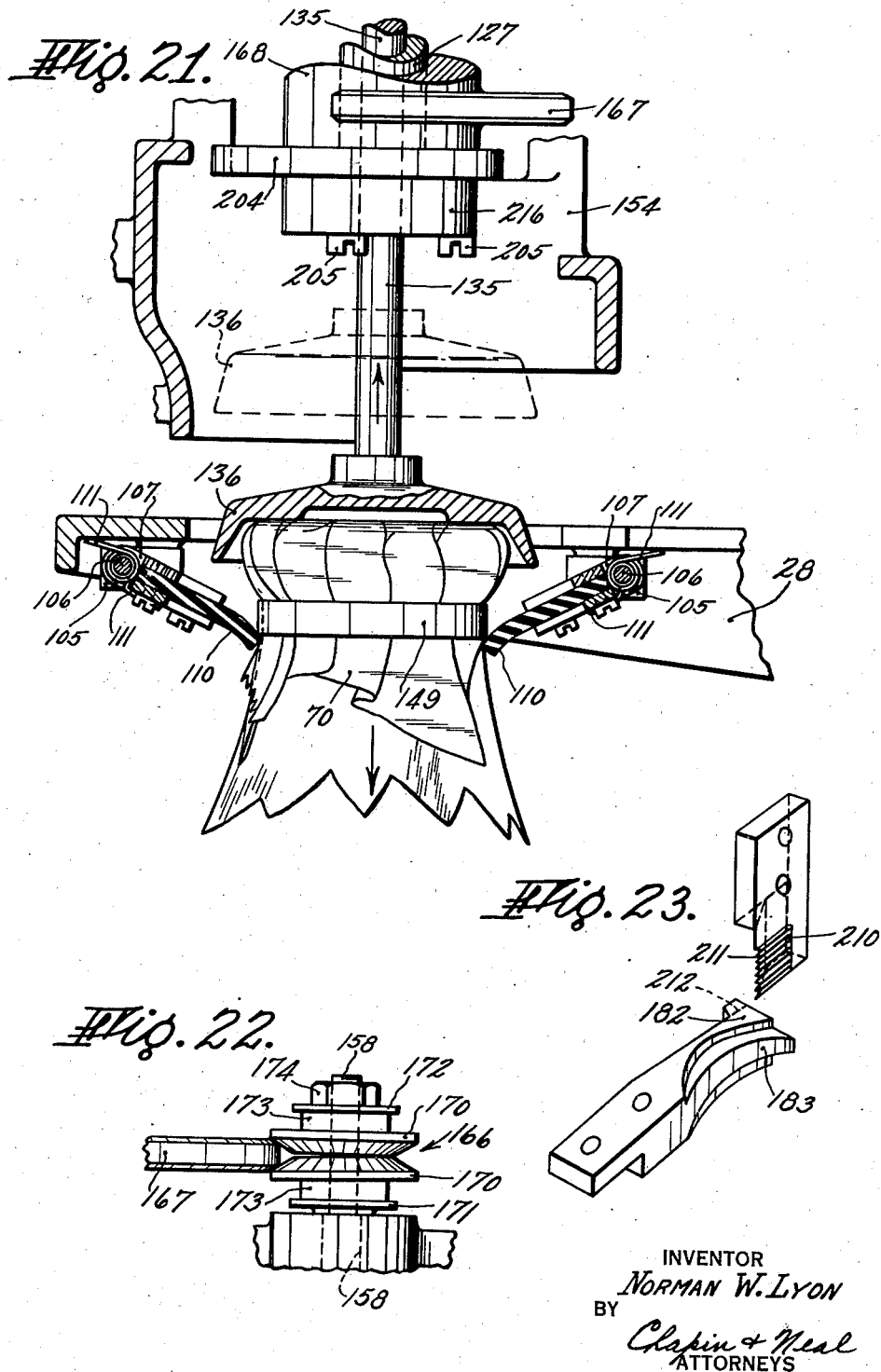

Patented Aug. 22, 1939

2,170,760

UNITED STATES PATENT OFFIC'

2,170,760

BOTTLE HOODING MACHINE

Norman W. Lyon, Springfield, Mass., assignor to Package Machinery Company, Springfield, Mass., a corporation of Massachusetts Application February 7, 1936, Serial No. 62,818

23 Claims. (Cl. 226—80)

This invention relates to machines for applying hoods of flexible and preferably transparent material to the necks of such bottles as are used for dispensing milk, and has particular reference to mechanism for securing the hood to the bottle neck by encircling the hood with a band of adhesive coated tape. Prior machines designed for this purpose have possessed some disadvantages from the standpoint of complexity of structure and inherent slowness of operation which it is the purpose of the present invention to avoid.

One object of the present invention is to provide an improved automatic mechanism for applying the tape to the bottle neck which will permit the bottle to remain stationary during the entire taping operation. A further object is to provide a self-contained mechanism rotating about the bottle neck which supplies the tape, presses it against the hood into adherence therewith, and severs the necessary length of tape. A further object is to provide improved means for supplying and delivering the tape to the bottle. A further object is to provide improved means for pressing the tape into adhering contact with the hood. A further object is to provide improved means for holding the end of the tape first applied to the hood against movement for a sufficient period to insure firm adhesion. A further object is to provide improved means for supplying and forming the hood material upon the bottle neck. A further object is to provide improved means for severing and positioning the tape so that the leading end is under proper control and will not become misplaced upon the bottle. A further object is to provide a mechanism of the type referred to in which the complexities inherent in prior devices have been obviated. A further object is to provide a mechanism having greater speed of operation than prior devices designed for the same general purpose. Additional objects will appear from the following description and claims.

Referring to the drawings:

Fig. 4 is a section on a horizontal plane, taken on line 4—4 of Fig. 1, showing the feeding mechanism for the hood material;

Fig. 5 is a section on line 5—5 of Fig. 1;

Fig. 6 is a detail of the feeding mechanism for the hood material;

Fig. 7 is a detail of the clutch mechanism by which the operation of the machine is controlled by the presence of a bottle;

Fig. 8 is a detail, generally similar to a portion of Fig. 1 but on a larger scale and partly in section, illustrating the construction of the hood and tape applying head;

Figure 9:
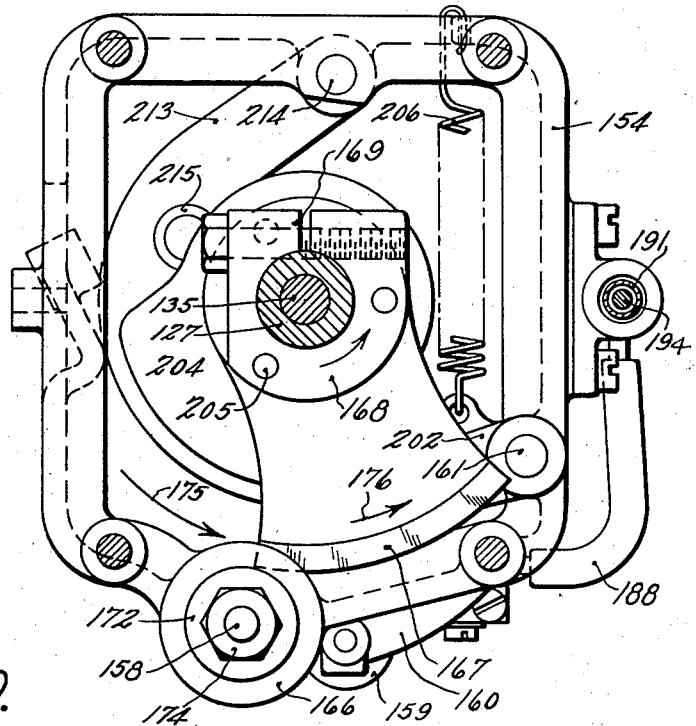
Figure 14:
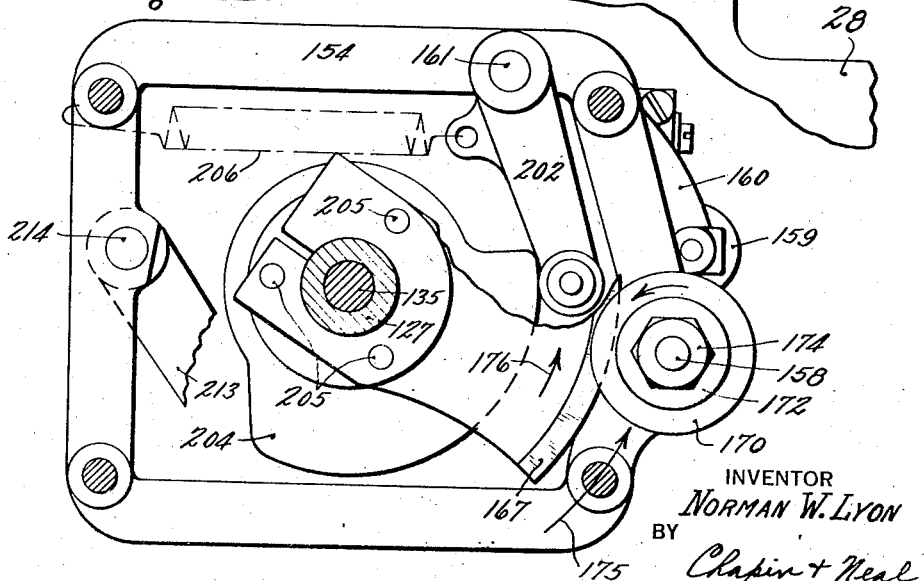
Figure 15:
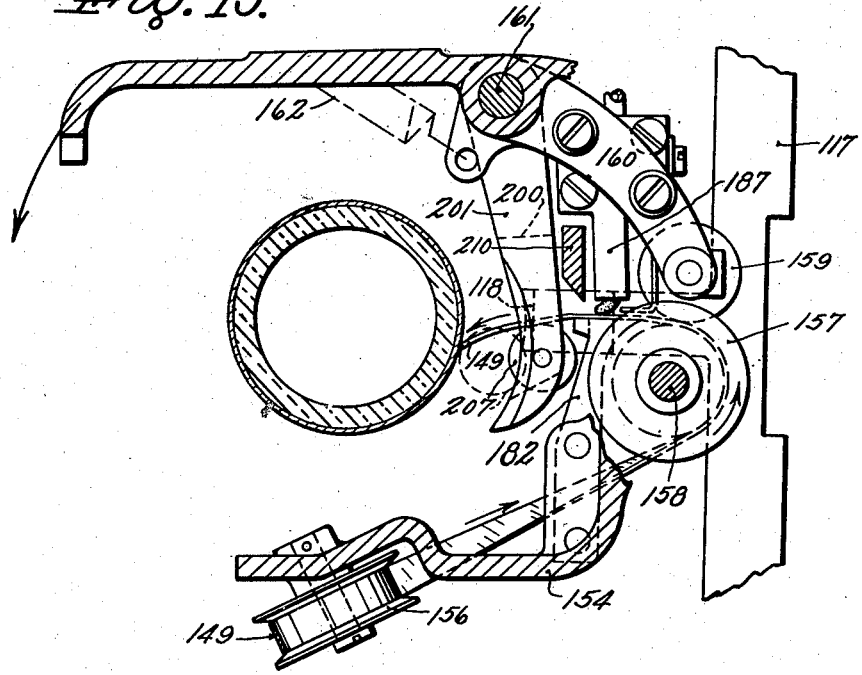
Figure 16:
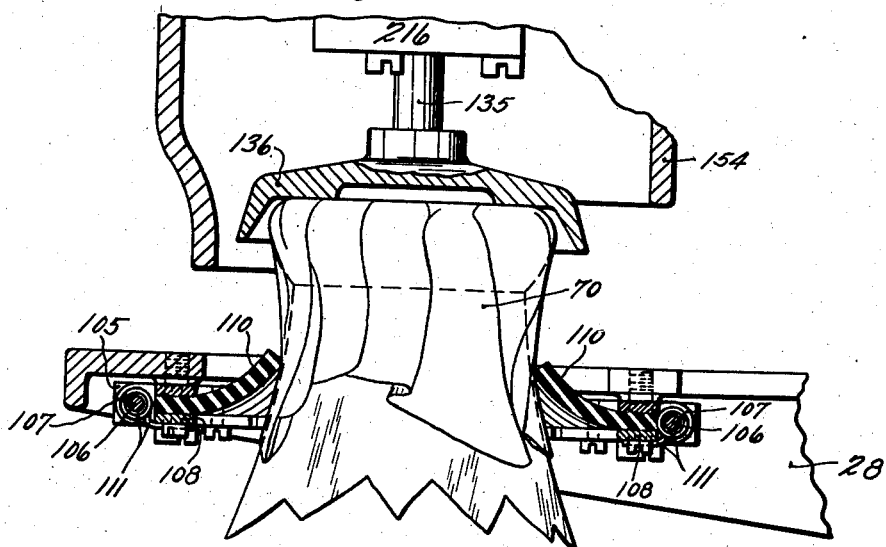

Figs. 9 to 13 inclusive are sections on lines 9—9, 10—10, 11—11, 12—12 and 13—13 respectively, of Fig. 8;

Fig. 14 is a detail similar to Fig. 9 but showing the parts in a different operative position;

Fig. 15 is a detail similar to Fig. 12 but showing the parts in a different operative position;

Fig. 16 is a sectional detail illustrating the manner in which the hood material is initially applied to the bottle;

Figs. 17 to 20 are details similar to Figs. 12 and 15 but showing the parts in successively later positions of operation;

Fig. 21 is a sectional detail similar to Fig. 16 but showing the manner in which a bottle with a completed hood thereon is removed from the machine;

Fig. 22 is a detail of the tape feed; and

Fig. 23 is a detail of the tape severing knife.

The mechanism is supported upon vertical members 25 provided with legs 26 and with a series of horizontal tables 27, 28 and 29. The first of these carries the motor drive and the starting clutch mechanism; the second carries the feeding device for the hood material; and the third carries the tape applying mechanism and its drive. These mechanisms will be considered in order.

Figure 1:
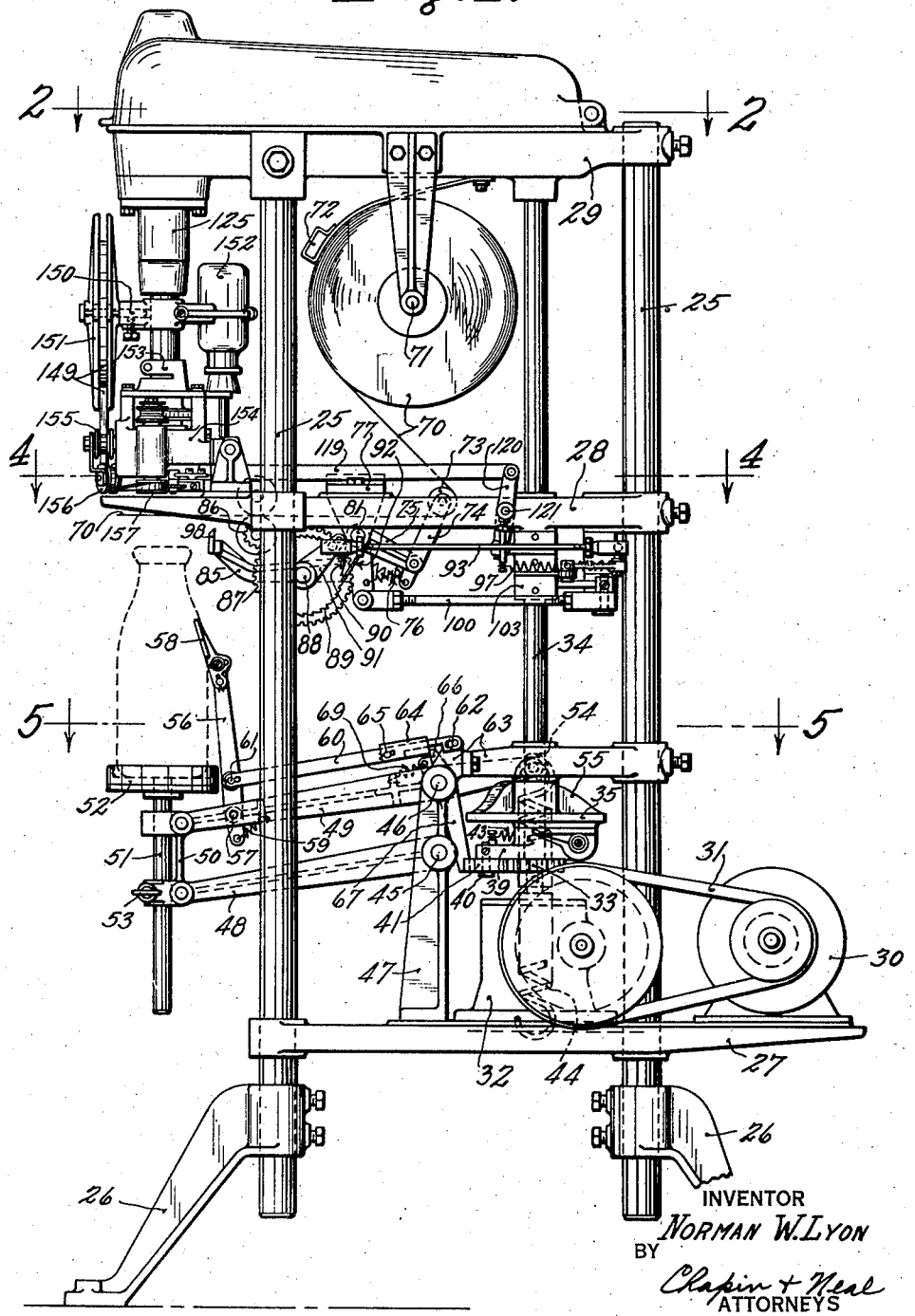
Fig. 1 is a side elevation of a machine embodying the invention.
Figure 2:
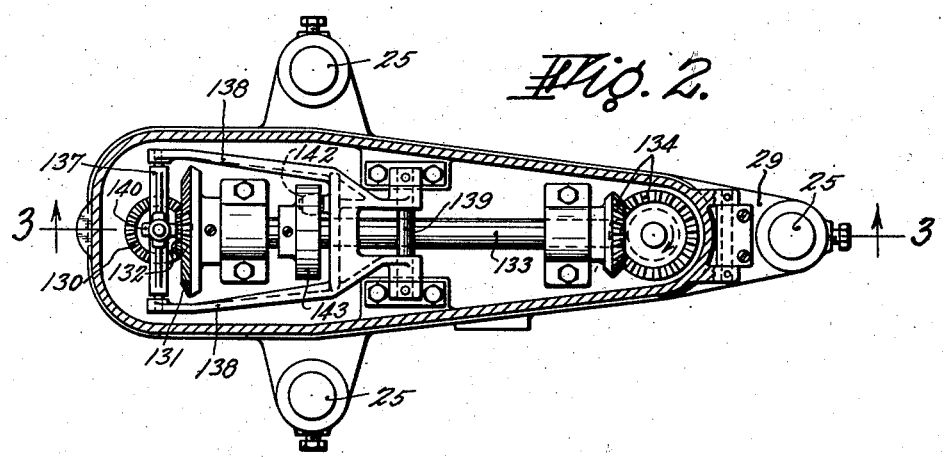
Fig. 2 is a section on a horizontal plane through certain driving mechanism, taken on line 2—2 of Fig. 1.

The source of power for the machine is a motor 30 (Fig. 1) connected by a belt drive 31 to a gear reduction unit 32. A toothed disk 33 (Figs. 1 and 7) is fixed to the upper end of the vertical shaft of this reduction unit. Above and in axial alignment with this toothed disk is a cam shaft 34 through which all of the mechanism operating on the bottle derives its movement. Near the bottom of this cam shaft is fixed a cam disk 35 bearing a bracket 36, through which motion is transferred to the shaft from the gear reduction unit. A rubber block 37 is interposed between the cam disk bracket and a bracket 38 extending from a member 39 which is free on the shaft. Pivoted at 40 on this member is an arm 41 bearing at one end a detent 42 adapted to engage the teeth on the disk 33 and normally held in contact with the disk by a spring 43. When the detent is in contact with the disk the cam shaft is coupled to the toothed disk, and through it to the gear reduction unit, through the rubber block which serves to cushion the shock of starting the parts in motion.

Pivoted at 45 and 46 (Fig. 1) to a bracket 47 arising from the table 27 are two arms 48 and 49 connected at their ends by a link 50 so as to form a parallel motion linkage. Mounted in the ends of the arms is a rod 51 bearing at its top a bottle receiving cup 52 and held in adjusted position by a clamp 53. The cup may be interchanged and varied in its vertical position in order to adapt the machine to bottles of varying sizes. The arm 49 has a rearwardly extending portion bearing a cam roll 54 engaging a crown cam 55 on the shaft 34, so that during the operation of the machine the bottle receiving cup will be elevated, held in elevated position for a predetermined time, and then again lowered to the position shown in Fig. 1. The actual elevation of the bottle is accomplished by a large spring 44 connected between the table 27 and a rearward extension of the arm 49, so that inequalities in heights of the bottle will not be liable to cause breakage. A vertical arm 56 is pivoted at 57 to the arm 49 and carries at its upper end a pivoted bottle contactor 58, the arm 56 being held by a spring 59 so that it tends to press lightly against the bottle. A link 60 is pivoted at 61 to the arm 56 and has at its other end a pin and slot guide 62 connecting it to a stationary bracket 63. When a bottle is put in place on the cup 52 the arm 56 and the link 60 will be pushed to the right as viewed in Fig. 1, and a hood 64 pivoted at 65 on the link 60 so as to embrace the cut-away end of that arm, will be brought against the end 66 of an arm 67 free on the pivot 46. When no bottle is in place, the lower end of this arm engages a notch 68 (Fig. 7) in the outer end of the detent lever 41, serving the double purpose of holding the detent 42 out of contact with the constantly rotating notched disk 33 and of holding the member 39 and the cam shaft 34 stationary. When a bottle is put in place on the cup 52 the lower end of the arm 67 is moved to the left as viewed in Fig. 1, and the detent lever 41 is released so that the detent engages with the notched disk, causing the cam shaft to rotate and the machine to start on its cycle of operation. As this operation proceeds the cam 55 will rotate, and the parallel motion linkage will be moved by the spring to elevate the bottle. The raising of this linkage lifts the hood 64 out of contact with the lever end 66, permitting the lever to snap back under the influence of a spring 69 (Fig. 1) so that its lower end is in position to engage the detent lever when this has made a complete revolution and thus to bring the cam shaft 34 to rest. During the lowering of the parallel motion linkage as the machine cycle proceeds the pivoted hood will at first ride upon the top of the lever end 66, and when the bottle is removed from the cup the hood will be moved to the left in Fig. 1 so that it will again drop down in back of lever end 66.

Figure 3:
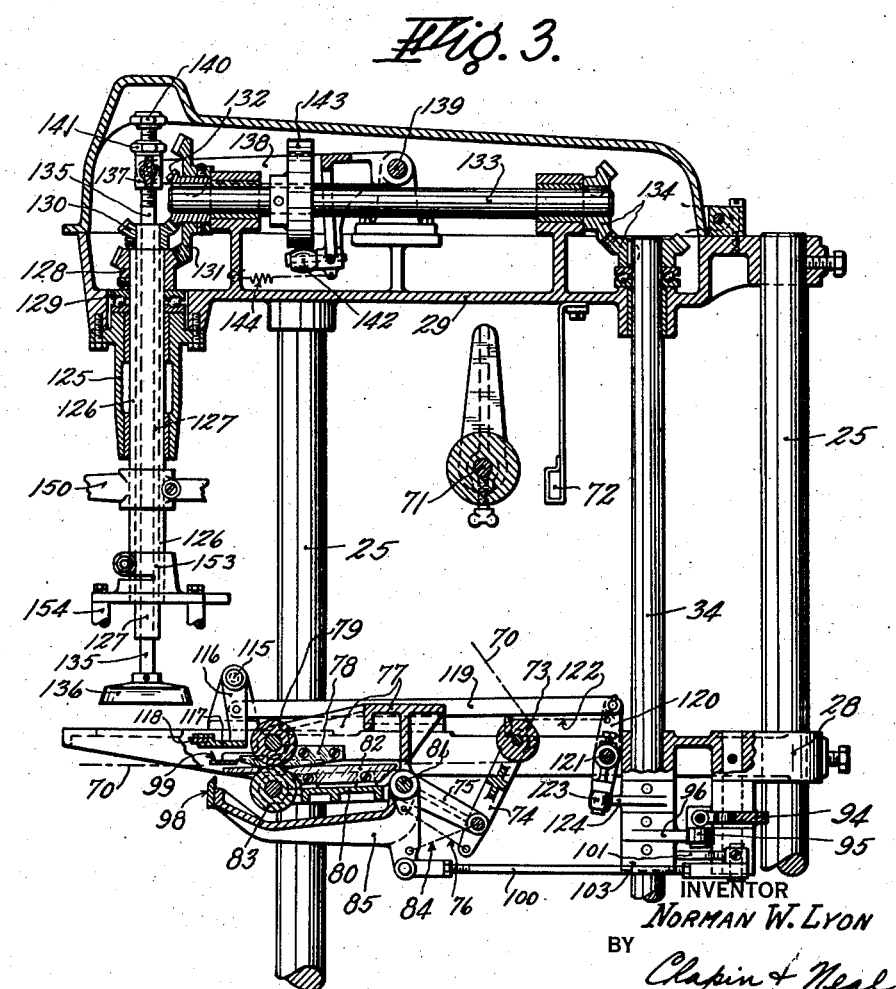
Fig. 3 is a section on a vertical plane through the upper portion of the machine, taken on line 3—3 of Fig. 2.

The mechanism for feeding the web of hood forming material and for severing blanks therefrom is mounted upon the second table 28. The hood material 70 (Figs. 1 and 3) is supplied in roll form from a supporting shaft 71, a weighted tension strap 72 of the usual form being hung over the roll to prevent overrunning. The material passes from the roll over the customary floating roll 73 for equalizing the pull on the web due to the intermittent feed. The floating roll is carried on an arm 74 pivoted to a bracket 75, which for the present purpose may be considered as stationary, and is held against the web by a spring 76. From the floating roll the web passes under a stationary bracket 77 having a pair of web crimping plates 78 (Figs. 3, 4 and 6) depending from it and also bearing a freely rotatable web feeding roll 79. Below the bracket 77 is a swinging bracket 80, pivoted on a cross shaft 81 and bearing as an extension the bracket 75 previously referred to. The swinging bracket carries a plurality of strips 82, some of them staggered with respect to the strips 78 and coacting with them to produce a longitudinal crimp in the web, and some laterally disposed with respect to the upper strips so as to furnish an underlying support for the web. The swinging bracket also carries a lower web feeding roll 83, driven as will be described, and is constantly pressed upwardly, so as to keep the roll 83 constantly pressed yieldingly against the upper roll 79, by a spring 84. This spring is stretched between the end of bracket 75 and a knife arm 85, and serves the double purpose of holding the knife cam roll against its cam and of holding the feeding rolls yieldingly together. At the same time the feeding rolls and the crimping strips can readily be separated if it is desired to thread the end of a fresh web between them. The crimping of the web is useful in giving the end of the web sufficient rigidity to stand straight out over the top of a bottle without the necessity of providing special supporting fingers.

The lower feeding roll is provided with a pinion 86 meshing with a gear 87 pivoted to the swinging bracket 80 at 88. Attached to the gear 87 is a ratchet 89 actuated at intervals by a pawl 90 carried by a pawl arm 91 also swinging on the pivot 88. A spring holdback 92 is provided to prevent retrograde motion of the ratchet. A link 93 is coupled to the pawl arm and to one arm of a bell crank 94 pivoted on the table 28 and bearing at its other end a roll 95 coacting with a cam 96 on the cam shaft 34 and held in contact with its cam by a spring 97. This web feeding arrangement projects a length of hood material once at each machine cycle, after which the necessary length is severed by a knife 98 carried at the end of the arm 85 and coacting with a stationary knife 99 on the bracket 77. A link 100 is coupled to the knife arm at one end and to a bell crank 101 at the other, this bell crank carrying a roll 102 coacting with a cam 103 on the shaft 34. The cam is timed to sever the hood sheet from the projecting end of the web at substantially the time that the bottle contacts with it, as will be described later, so that the severed sheet will not fall in spite of the lack of other support.

Also mounted on the bracket 77 is a device, best shown in Figs. 8, 12, 13, 16 and 21, which drapes and pleats the hood material over the top of the bottle. Fixed to the lower side of the bracket are four bearings 105 in which are mounted four pintles 106. Four members 107 are pivoted on these pintles, and serve together with four segmental rings 108 to clamp four pieces of sheet rubber 109. The rubber sheets are cut at their inner ends to a circle somewhat smaller than the top of the bottle, and are severed to form a circumferentially disposed series of fingers 110. Helical springs 111 are mounted on each of the pintles, and have one end disposed under the bracket and the other end under the segmental rings, so that a constant yielding force is exerted on the rubber fingers tending to keep them in a horizontal position. The rubber fingers are by reason of their mounting incapable of moving upwardly except by individual flexing, as shown in Fig. 16, so that they drape the hood material snugly around the bottle and form pleats in its skirt portion; but as the bottle descends as in Fig. 21 they move as units so as to avoid any tendency to strip the newly formed hood from the bottle.

The table 28 supports a tape clamp, the function of which can best be explained later. Pivoted at 115 to brackets on the table 28 are arms 116 carrying at their lower ends a bar 117 having a tape clamp 118 fixed at its central portion as shown in Fig. 8. A link 119 is coupled to each arm 116 at one end and to a rocker 120 at the other, the two rockers being fixed to a cross shaft 121 and one of them being joined by a spring 122 to the table 28. One of the rockers bears a roll 123 (Fig. 3) held by the spring 122 against a cam 124 fixed on the cam shaft 34.

Mounted on the bottom of the upper table 29 is a bearing 125 (Fig. 3) in which rotate two concentric sleeves 126 and 127. The first of these sleeves forms a rotatable support for the tape applying means and the second acts as a cam shaft for actuating certain tape applying parts. The outer sleeve is supported at its top by a bevel gear 128 which rests upon a ball bearing 129 on the upper end of the bearing 125; and the inner sleeve is supported by a bevel gear 130 which rests upon the top of the gear 128. The two gears are driven respectively by bevel gears 131 and 132 both fixed to the end of a shaft 133 suitably journaled on the table 29 and coupled to the upper end of the cam shaft 34 by bevel gearing 134. The ratios of the pairs of gears driving the sleeves is chosen so that the sleeve 127, which acts as a cam shaft, makes one revolution in a machine cycle while the outer sleeve makes two revolutions. This permits the outer sleeve to carry the tape applying mechanism twice around the bottle neck, and yet causes a single revolution of the cam shaft 127 relative to this mechanism.

Reciprocable within the inner sleeve is a rod 135 carrying at its lower end a conical holder 136 for the top of the bottle. This rod moves up and down but does not rotate. At its upper end the rod is threaded into a strut 137 extending between the two sides of a yoke 138 pivoted to the table 29 at 139. The rod is provided with a handwheel 140 by which it may be threaded up or down in the strut to vary its vertical adjustment, and with a check nut 141 for holding it in adjusted position. The yoke 138 is provided with a roll 142 held against a cam roll 143 on the shaft 133 by a spring 144. The described mechanism serves to hold the conical member 136 against the top of the bottle when the latter is in its elevated position, so that the hood is kept from slipping while the tape is being applied, and to carry the conical member downwardly when the completely hooded bottle is being lowered to give further protection against the stripping of the hood from the bottle (Fig. 21).

The outer sleeve 126 carries a clamp 150 supporting a tape reel 151 (Figs. 1 and 8) and a bottle 152 containing a tape sealing liquid such as a solvent in case the tape is provided with a soluble adhesive coating. The reel and the bottle rotate with the sleeve during the time when the latter turns. Below the clamp 150 is a second clamp 153 supporting a housing 154 in which the various tape applying devices are carried, this housing also rotating with the sleeve. The housing carries a pair of tape guiding rolls 155 and 156 disposed below the reel; the first being in line with the reel and the second being at an angle in order to guide the tape to a feed roll 157 mounted in the housing on a vertical shaft 158. The tape 149 is pressed against the feed roll by a knurled pressure roll 159 freely rotatable on the end of an arm 160 carried on a vertical shaft 161 and given a yielding pressure against the feed roll by a spring 162.

The shaft 158 which carries the tape feed roll 157 is journaled in a boss 165 formed in the side of the housing 154. At its upper end the shaft carries a friction drive wheel 166 adapted for engagement with a segmenetal driving member 167 formed with a hub 168 (Fig. 8) clamped at 169 (Fig. 9) to the inner sleeve 127. As is shown in detail in Fig. 22, the wheel 166 is preferably made of two opposed conical disks 170 separated from a flange 171 and a washer 172 on the shaft 158 by rubber washers 173. These rubber washers can be compressed by a nut 174 on the end of the shaft so that the disks 170 can be forced to engage the slightly tapered sides of the segmental member 167 with sufficient pressure to insure a positive drive. The operation of this friction drive will be clear from a comparison of Figs. 9 and 14. The housing 154, being carried by the outer sleeve, rotates at a speed twice as fast as the segmental member 167 which is carried by the inner sleeve. In Fig. 9 the driving wheel 166 moving in the direction of the arrow 175 is just overtaking the segmental member, which is also moving in the direction of the arrow 176 but at a slower rate. The difference in speeds is indicated by the different lengths of the two arrows. It is the relative movement between the two moving members which causes the tape feeding rotation of the shaft 158. Fig. 14 shows a later stage in the operation, both the wheel and the segmental member having shifted their position, with the wheel having advanced a considerable distance along the periphery of the segmental member.

As is best shown in Fig. 8, the feeding wheel 157 is provided with a shallow central groove 180 and with guiding flanges 181. The wheel 159 is relatively narrow, so that it can press the tape slightly into the groove 180 and thus crimp the tape sufficiently to give it a rigidity sufficient to permit it to be projected clear of any support into adjacency with the bottle. The wheel 159 preferably has a knurled surface so that it can get a better grip on the tape, and the wheel 157 may if desired have a rubber contact surface. From the feeding wheels the tape passes the end of a support and cutting block 182 having a flange 183 (Fig. 23) of a width permitting it to pass between the flanges 181 of the roll 157 and thus keep the tape from following the surface of the roll. The tape is kept in adjacency with the end of this block by a guide piece 184.

As the tape is projected past the block 182 it contacts with the end of a wick 185 extending from a chamber 186 formed in a member 187 carried by the arm 160 (Fig. 11) so that it may be swung away from the roll 157 together with the roll 159 to permit the tape to be threaded into place. The chamber 186 is connected by tubing 188, which may if desired be provided with the usual regulating and shut off valve, with a well 189 formed in a vertically extending member 190 (Fig. 8) also carried by the housing. Fitting loosely into the well is a tube 191 steadied by a guide 192 on the housing and fitted tightly into a cork 193 which closes the end of the solvent bottle 152. A rod 194, carrying a stopper 195 at its top and provided with a bent lower end 196, passes freely through the tube. When the bottle, with its cork and the attached tube 191, is lifted off the guide 192 for refilling, the rod 194 drops and its stopper 195 closes the upper end of the tube so that no liquid can run out. When the bottle is again replaced the bent lower end of the rod strikes against the bottom of the well and raises the stopper sufficiently so that liquid can travel down the tube into the chamber. The bottle then acts to supply solvent to the wick by the usual constant level fountain feed principle.

Figure 10:
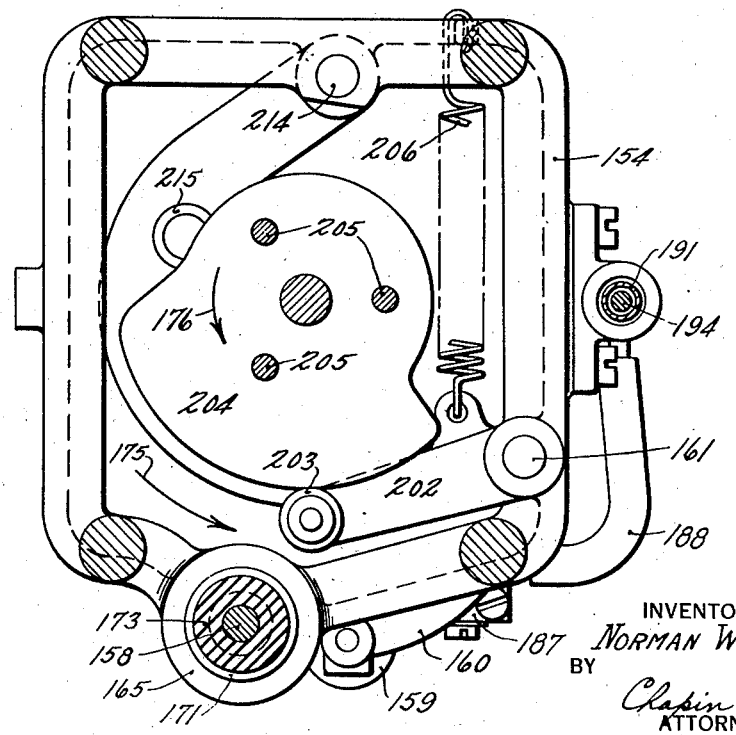
Figure 13:
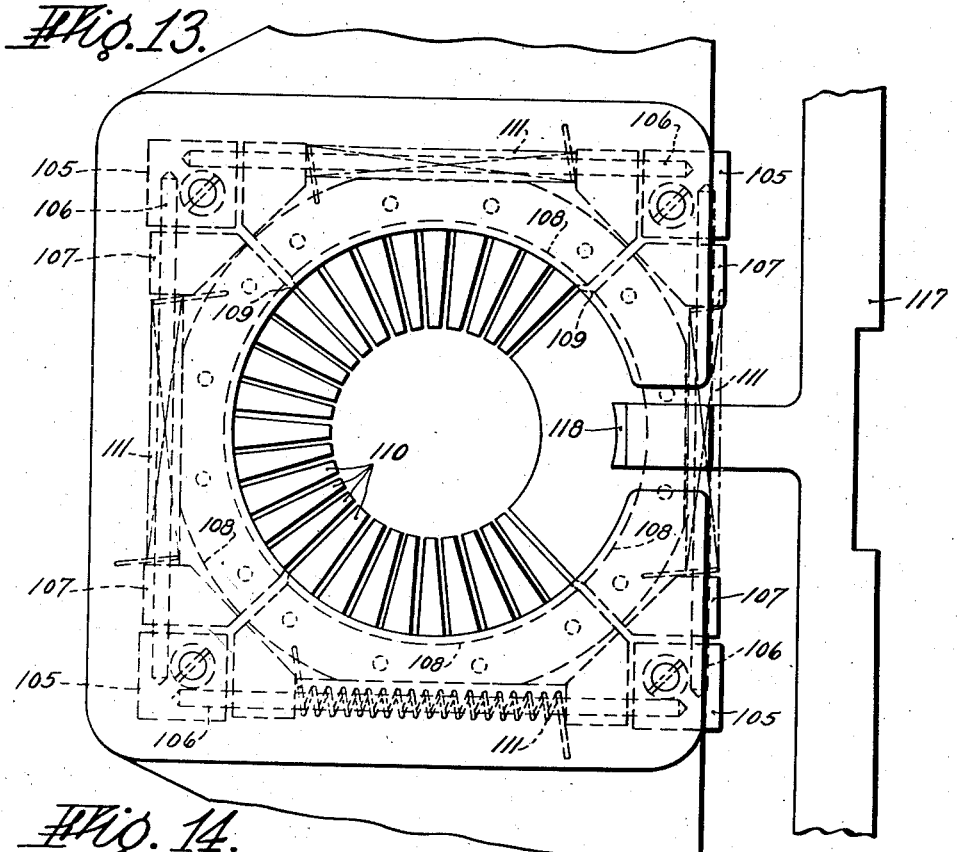
Figure 17:
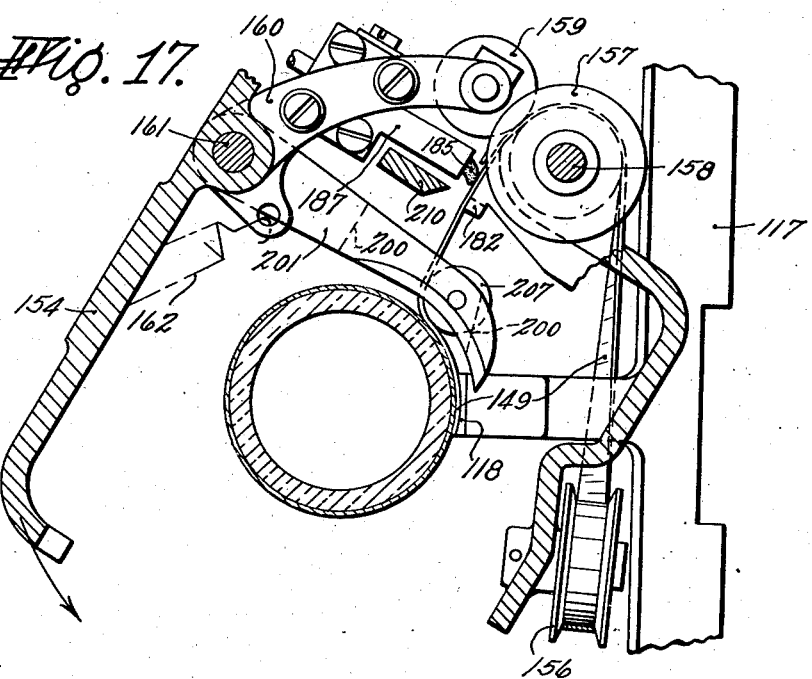

As the housing starts to rotate the tape will be projected in the manner described, passing the block 182 in a substantially straight line until it hits the hood on the bottle. The bottle is stationary, and the motion of the housing will cause the tape to be bent rearwardly with respect to the direction of rotation of the housing as is indicated in Fig. 15. As the tape is being projected it passes through an aperture 200 in an applicator finger 201 fixed to the shaft 161 (Fig. 15). A second arm 202 (Figs. 10 and 14) fixed on this shaft carries a roll 203 resting against a cam 204 secured by screws 205 to the hub 168 of the segmental member 167, and is held yieldingly against this cam by a spring 206 (Figs. 9 and 10). The arm 201 carries a roll 207 (Fig. 15) pivoted within the aperture 200 so as to project slightly inwardly of the arm. The mechanism described operates to swing the arm during the rotation of the housing and at a time immediately after the tape has been projected into contact with the hood on the bottle; this swinging movement shifting the roll 207 from the full to the dotted line position of Fig. 15 so as to press the adhesive tape against the hood. As the rotation of the housing continues the tape driving roll 166 passes beyond the end of the segmental member 167, the cams being set so that this action occurs just after the tape has been clamped to the bottle by the applicator roll. Sufficient positive feed is provided for after the tape has been clamped by the applicator roll so that the pressure member 118 has a chance to come in and grip the tape to the stationary bottle as shown in Fig. 17, that figure showing the parts in substantially the positions they occupy when the positive feed of the tape stops. From this time on, the tape is held to the stationary bottle by the finger 118, and as the housing rotates the tape will be drawn out through the now freely rotatable rolls 157 and 159 by being wound around the bottle neck.

Figure 18:
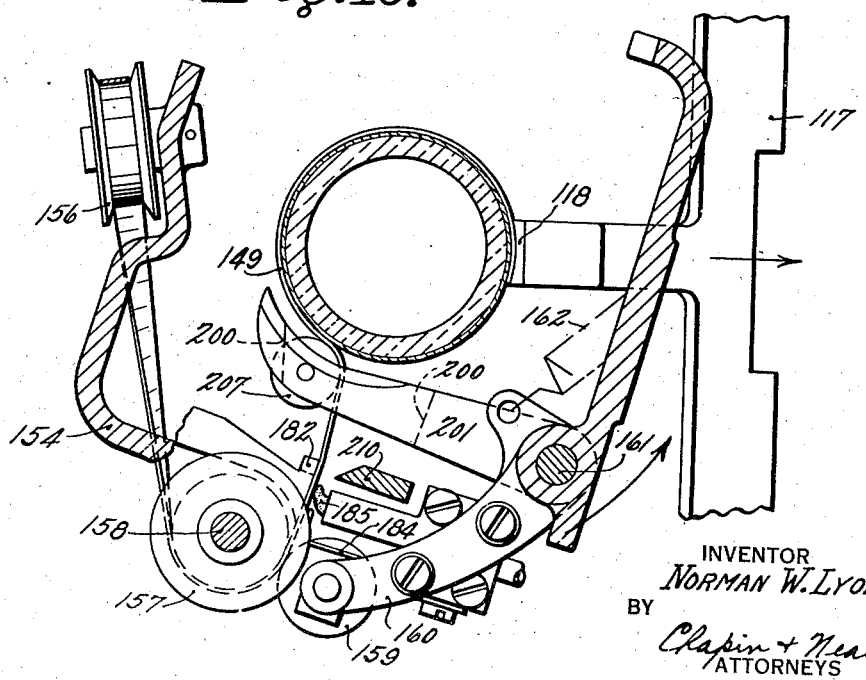

This condition of affairs continues until about the position of rotation of the housing shown in Fig. 18. The tape then extends around the bottle neck sufficiently so that the finger 118 can be withdrawn without danger of the tape being pulled loose from the hood. At about this position, therefore, the cam 124 operates to withdraw the finger 118 so that by the time the roll 207 reaches the position of Fig. 19 the finger is completely out of the way. The finger 118 is mounted, as has been previously described, on arms 116 pivoted at 115. As the finger moves from contact with the bottle into the position of Fig. 8 it will turn about shaft 115 as a center, and will therefore drop from a position on a level with rolls 157 and 159 in that figure to the position shown. This lowering of the finger carries it well below the roll 207 as shown in Fig. 19 so that no interference will exist.

The tape has now completely encircled the bottle and is overlapped on itself. It is now necessary to sever it. For this purpose a knife mechanism is provided, embodying a blade 210 (Figs. 11 and 23) coacting with the end of the block 182. The blade and the block are preferably provided with interfitting serrations, as shown at 211 and 212 in Fig. 23, in order to insure a quick cutting of the tape while the tape and cutting members are in relative movement. The blade 210 is mounted on the end of an arm 213 pivoted to the housing at 214 and bearing a roll 215 held against the surface of a cam 216 by a spring 217 (Fig. 11). The cam, which is held by the screws 205, gives a short but rapid movement to the blade while the housing is in rotation, severing the part of the tape attached to the bottle from the body of the tape web. This body portion no longer feeds out, since at that time the feed rolls are not being driven by the segmental member 167, but the rotation of the housing continues until the roll 207 has pressed the trailing end of the severed tape against the underlying first turn of the tape on the hood (Fig. 19). The housing continues in rotation until it reaches its position of rest (indicated by the dotted line position of roll 157 in Fig. 20), when it is stopped by the action of the one revolution clutch previously described as being set into operation by the placing of a bottle in the machine. During this continued rotation the applicator roll 207 is moved and kept away from the bottle as in Fig. 20.

After the tape has been completely applied to the bottle and the applicator roll has moved out of contact with the hood, the bottle elevator moves downwardly to carry the neck of the bottle through the hood pleating fingers into a position in which it can be removed from the machine. During this downward motion of the bottle, the bottle clamping member 136 also moves downwardly as in Fig. 21 in order to prevent the fingers from stripping the hood from the bottle neck. The fingers have very little tendency to do this by reason of their pivotal mounting, which permits them to swing freely in a downward direction as seen in Fig. 21, but since the adhesive on the tape may not have had time to become fully set on account of the high speed at which the machine may be operated, it is preferred to hold the top of the hood at the same time. When the bottle has been completely lowered, the one revolution clutch stops all of the machine parts, these parts remaining at rest until a bottle is again put in place on the elevator.

What I claim is:

1. In a machine for securing a hood upon a bottle, means for holding a hooded bottle against rotation, a member rotating about the axis of the stationary bottle, a tape supply carried by the member for rotation with it, means carried by the member for applying a sealing liquid to the tape, tape feeding means carried by the member and operable to project the end of the tape into contact with the hood on the bottle, an applicator finger carried by the member, means for moving said finger to press the end of the tape against the bottle and thereafter to hold the finger against the tape to guide and press it into contact with the hood on the bottle as the member revolves, a finger non-revoluble with respect to the bottle movable to clamp the leading end of the tape against the hood after said end has been applied thereto by the applicator finger, and means for introducing the bottle into and removing it from the zone of operation of said mechanism.

2. In a machine for securing a hood upon a bottle, means for holding a hooded bottle against rotation, a member rotating about the axis of the stationary bottle, means carried by said member for supplying an adhesive tape, an applicator finger carried by the member, means for moving said finger against the hood on the bottle and for holding the finger yieldingly thereagainst during the rotation of the member, tape feeding means carried by said member, means for operating said tape feeding means to project the tape positively into position to be pressed against the hood by the applicator finger, and for permitting the tape to be drawn out by the rotation of the member after a substantial length thereof has been applied to the hood by the applicator finger, and means for severing the tape from the supply.

3. In a machine for securing a hood upon a bottle, means for holding a hooded bottle against rotation, a member rotating about the axis of the stationary bottle, means carried by said member for supplying an adhesive tape, an applicator finger carried by the member, means for moving said finger against the hood on the bottle and for holding the finger yieldingly thereagainst during the rotation of the member, tape feeding means rotatable with the member and operable to deliver tape into position to be applied to the hood by the applicator finger, and means for severing a length of tape after a portion thereof has been applied to the hood.

4. In a machine for securing a hood upon a bottle, means for holding a hooded bottle against rotation, a member rotating about the axis of the stationary bottle, means carried by said member for supplying an adhesive tape, an applicator finger carried by the member, means for moving said finger against the hood on the bottle and for holding the finger yieldingly thereagainst during the rotation of the member, and tape feeding means rotatable with the member and operable to deliver tape into position to be applied to the hood by the applicator finger.

5. In a machine for securing a hood upon a bottle, means for holding a hooded bottle, means rotating about the axis of the bottle for supplying a length of adhesive tape, means rotating about the axis of the bottle for pressing the tape directly against the hood and progressively around its circumference, and means rotating about the axis of the bottle for severing a predetermined length of tape after a portion thereof has been applied to the hood.

6. In a machine for securing a hood upon a bottle, means for holding a hooded bottle against rotation, a pair of concentric members rotatable around the axis of the bottle, means carried by one of the members for feeding a length of adhesive tape to and applying it upon the hood around the neck of the bottle, cam members carried by the other member for operating said means, and means for rotating said concentric members at a differential rate such that said means are carried more than once around the bottle while being caused to go through one complete cycle of operation.

7. In a machine for securing a hood upon a bottle, means for holding a hooded bottle against rotation, means for supplying a length of adhesive tape, a spring pressed finger movable around the axis of the bottle to press the tape into adhesive contact with the hood, and a clamp non-rotatable with respect to the bottle and movable to press against the neck of the bottle the part of the tape first to be laid against the hood by the finger.

8. In a machine for securing a hood upon a bottle, means for holding a hooded bottle against rotation, means for supplying a length of adhesive tape, a spring pressed finger movable a plurality of times around the axis of the bottle in one machine cycle to press the tape into adhesive contact with the hood, a clamp non-rotatable with respect to the bottle and positioned to contact with the portion of the tape first to be laid against the hood by the finger, and means for moving the clamp to press against the bottle neck the said portion of the tape after the finger has passed by the clamp and for moving the clamp out of the path of said finger before the finger again reaches the clamp.

9. In a machine for securing a hood upon a bottle, means for holding a hooded bottle against rotation, a member rotatable around the axis of the bottle, a slotted finger carried by said member, a tape supply carried by said member, tape feed rolls carried by said member and positioned to deliver tape through the slot in the finger, means carried by said member for applying a sealing liquid to the tape, means carried by said member for severing a length of tape, and means for coordinating the operation of said instrumentalities so that the leading end of the tape is first projected through the slot in the finger into contact with the hood on the bottle, the finger then presses the tape into contact with the bottle, and after a sufficient length of tape has been delivered to pass at least once completely around the bottle said length is severed from the body of the tape.

10. In a machine for securing a hood upon a bottle, means for holding a hooded bottle against rotation, a member rotatable around the axis of the bottle, a slotted finger carried by said member, a tape supply carried by said member, tape feed rolls carried by said member and positioned to deliver tape through the slot in the finger, means carried by said member for applying a sealing liquid to the tape, means carried by said member for severing a length of tape, means for operating said instrumentalities so that the leading end of the tape is first projected through the slot in the finger into contact with the hood on the bottle, the finger then presses the tape into contact with the hood, and after a sufficient length of tape has been delivered to pass at least once completely around the bottle said length is severed from the body of the tape, a clamp non-rotatable with respect to the bottle and positioned to contact with the portion of the tape first to be laid against the hood by the finger, and means for moving the clamp inwardly to press against the bottle neck the said portion of the tape after the finger has passed by the clamp and for moving the clamp outwardly before the finger again reaches the clamp.

11. In a machine for securing a hood upon a bottle, means rotating about the axis of the bottle for supplying a length of tape, means rotating about the axis of the bottle for applying the tape to the hood around the neck of the bottle, and means operative during the action of the applying means for holding the tape to the hood so that it will not be shifted thereon by the action of the applying means.

12. In a machine for securing a hood upon a bottle, means for holding the bottle in a stationary position, means rotating about the axis of the bottle for supplying a length of tape, means rotating about the axis of the bottle for applying the tape to the hood around the neck of the bottle, a presser for holding the tape to the stationary bottle so that it will not be shifted on the hood by the action of the applying means, and means for operating the presser in timed relation to the tape applying means.

13. In a machine for securing a hood upon a bottle, a carrier rotatable around a bottle, means for rotating the carrier through a definite cyclical rotation, a tape supply on the carrier, means on the carrier for pressing the tape against a hood on the bottle, means on the carrier for feeding the tape from the supply towards the bottle during the initial part of the cyclical rotation of the carrier, and tape severing means on the carrier.

14. In a machine for securing a hood upon a bottle, a carrier rotatable around the bottle, means for rotating the carrier through a definite cyclical rotation, a tape supply on the carrier, means on the carrier for pressing the tape against a hood on the bottle, means on the carrier for feeding the tape from the supply towards the bottle during the initial part of the cyclical rotation of the carrier, tape severing means on the carrier, and means for actuating the tape severing means to sever the tape at a predetermined period in the cyclical rotation of the carrier.

15. In a machine for securing a hood upon a bottle, a carrier rotatable around the bottle, means for rotating the carrier through a definite cyclical rotation, means on the carrier for feeding a length of tape to the bottle, means for actuating said feeding means during a portion only of the cyclical rotation of the carrier, and means on the carrier for pressing the tape against a hood on the bottle.

16. In a machine for securing a hood upon a bottle, a carrier rotatable around a bottle, means for rotating said carrier a definite cyclical rotation, a tape supply on the carrier, means on the carrier for pressing the tape against a hood on the bottle, and tape severing means on the carrier.

17. In a machine for securing a hood upon a bottle, a carrier rotatable around a bottle, means for rotating said carrier a definite cyclical rotation, a tape supply on the carrier, means on the carrier for treating said tape to render it sufficiently adhesive to adhere to the hood, means on the carrier for pressing the tape against a hood on the bottle, and tape severing means on the carrier.

18. In a machine for securing a hood upon a bottle, a carrier rotatable around a bottle, means for rotating said carrier a definite cyclical rotation, a tape supply on the carrier, means on the carrier for treating said tape to render it sufficiently adhesive to adhere to the hood, means on the carrier for pressing the tape against a hood on the bottle, tape severing means on the carrier, and means for actuating the tape severing means to sever the tape at a predetermined period in the cyclical rotation of the carrier.

19. In a machine for securing a hood upon a bottle, a carrier rotatable around a bottle, means for rotating said carrier a definite cyclical rotation, a tape supply on the carrier, means on the carrier for treating said tape to render it sufficiently adhesive to adhere to the hood, means on the carrier for pressing the tape against a hood on the bottle, tape severing means on the carrier, means for feeding the tape towards the bottle during the initial part of the cyclical rotation of the carrier, and means for actuating the tape severing means to sever the tape at a predetermined period in the cyclical rotation of the carrier.

20. In a machine for securing a hood upon a bottle, a carrier rotatable around the bottle, means for rotating the carrier through a definite cyclical rotation, feed rollers on the carrier for feeding tape to the bottle, means on the carrier for pressing tape so fed against the hood on the bottle, and means for driving said rollers during the initial portion only of the cyclical rotation of the carrier while leaving the rollers free for rotation by the tape as it is wound around the hood.

21. In a bottle hooding machine, means for draping a hood over the mouth and neck of the bottle and holding the hood to the bottle neck, a supply for adhesive tape rotatable around the neck of the bottle, a device rotatable around the neck of the bottle for pressing said tape directly against the hood while the hood is so held, and means automatically operable after a predetermined length of tape has been supplied for severing the tape from the supply.

22. In a bottle hooding machine, means for draping a hood over the mouth and neck of the bottle and holding the hood to the bottle neck, a supply for tape rotatable around the neck of the bottle, means for applying a sealing liquid to the tape as it is being supplied, a device rotatable around the neck of the bottle while the hood is so held for pressing directly against the hood the tape which has been so treated, and means automatically operable after a predetermined length of tape has been supplied for severing the tape from the supply.

23. In a bottle hooding machine, means for draping a hood over the mouth and neck of the bottle and holding the hood to the bottle neck around a circumference adjacent the bottom edge of the skirt, a supply for adhesive tape rotatable around the neck of the bottle, a device rotatable around the neck of the bottle in a plane above that portion of the hood which is being so held for pressing the tape directly against the hood while the hood is so held, and means automatically operable after a predetermined length of tape has been supplied for severing the tape from the supply.

NORMAN W. LYON.